US008272865B2

(12) United States Patent
Higashi et al.

(10) Patent No.: US 8,272,865 B2
(45) Date of Patent: Sep. 25, 2012

(54) RESIN INJECTION MOLD

(75) Inventors: Yoshikazu Higashi, Moriyama (JP); Satoshi Abe, Moriguchi (JP); Isao Fuwa, Osaka (JP); Masataka Takenami, Moriguchi (JP); Norio Yoshida, Nara (JP)

(73) Assignee: Panasonic Corporation, Osaka (JP)

( * ) Notice: Subject to any disclaimer, the term of this patent is extended or adjusted under 35 U.S.C. 154(b) by 23 days.

(21) Appl. No.: 12/934,463

(22) PCT Filed: Mar. 23, 2009

(86) PCT No.: PCT/JP2009/055636
§ 371 (c)(1),
(2), (4) Date: Nov. 5, 2010

(87) PCT Pub. No.: WO2009/119490
PCT Pub. Date: Oct. 1, 2009

(65) Prior Publication Data
US 2011/0045120 A1    Feb. 24, 2011

(30) Foreign Application Priority Data
Mar. 26, 2008    (JP) .................................. 2008-082165

(51) Int. Cl.
*B29C 45/73*    (2006.01)

(52) U.S. Cl. ...................... 425/547; 425/552; 425/812

(58) Field of Classification Search .................. 425/547, 425/548, 552, 812
See application file for complete search history.

(56) References Cited

U.S. PATENT DOCUMENTS

| 2002/0071887 A1* | 6/2002 | Seno et al. ..................... 425/547 |
| 2002/0121718 A1* | 9/2002 | Winget et al. .................. 264/102 |
| 2004/0056385 A1* | 3/2004 | Neter et al. ............... 264/328.14 |
| 2005/0147712 A1* | 7/2005 | Pesavento ...................... 425/533 |
| 2006/0204608 A1* | 9/2006 | Neter et al. .................... 425/547 |
| 2006/0257511 A1  | 11/2006 | Iwamoto et al. |
| 2007/0120297 A1* | 5/2007 | Wieder .................... 264/328.14 |
| 2008/0054510 A1* | 3/2008 | Cowelchuk et al. ........... 264/102 |
| 2008/0254162 A1* | 10/2008 | Iimura et al. .................. 425/547 |
| 2009/0072436 A1* | 3/2009 | Dean ............................ 264/219 |

FOREIGN PATENT DOCUMENTS

| JP | 08-300363 | 11/1996 |
| JP | 09-052231 | 2/1997 |
| JP | 11-348041 | 12/1999 |

(Continued)

*Primary Examiner* — Tim Heitbrink
(74) *Attorney, Agent, or Firm* — Greenblum & Bernstein, P.L.C.

(57) ABSTRACT

Disclosed is a mold for resin injection molding that can realize rapid heating or cooling. A resin injection molding mold includes a cavity mold and a core mold and is produced on a base plate by metal photofabrication. The cavity mold is provided with a cavity warm water circuit for allowing warm water for heating to flow and a cavity cold water circuit for allowing cold water for cooling to flow. The core mold is also provided with a core warm water circuit and a core cold water circuit. The core mold includes an air blowing passage for feeding warm air or cold air into a resin molding part and a suction passage (36) for sucking a gas within the resin molding part. The resin molding part side of the air blowing passage and the suction passage is formed of a low-density shaping part that has a low metallic powder sintered density and is permeable to gas. Warm air or cold air can be blown through the low-density shaping part, whereby rapid heating or cooling of the resin injection molding mold can be realized.

18 Claims, 9 Drawing Sheets

FOREIGN PATENT DOCUMENTS

| | | |
|---|---|---|
| JP | 2003-301202 | 10/2003 |
| JP | 2004-124201 | 4/2004 |
| JP | 2007-070655 | 3/2007 |
| WO | 2004/048062 | 6/2004 |

* cited by examiner

RESIN INJECTION MOLD

TECHNICAL FIELD

The present invention relates to a resin injection mold produced by metal stereolithography.

BACKGROUND TECHNIQUE

Conventionally, a mold used for injection molding a resin is known. A temperature of the resin injection mold is adjusted by flowing water or oil whose temperature is set in a range of 40 to 120° C. through a straight water pipe provided in the mold. When a higher temperature is required, a rod-like heater is implanted in the mold and the temperature is adjusted. In the resin injection mold, to eliminate a weld line of a molded article, to prevent a sink mark, and to enhance transfer precision of the mold, it is necessary to bring the temperature of a mold surface close to a melting temperature of the resin. In order to do so, however, if the mold surface is heated using warm water or a heater, the entire mold is heated, and if a volume of the mold is large, it takes time to rise the temperature of the mold surface to a temperature required for molding the resin, and it also takes time to cool the mold.

There is known a resin molding mold in which a pipe through which heating water vapor flows is provided in the vicinity of the mold surface, and a pipe through which cooling water flows is provided at a location away from the mold surface (see Japanese Patent Application Laid-open No. H11-348041 for example). In such a mold, however, heating ability and cooling ability of the mold surface are insufficient.

DISCLOSURE OF THE INVENTION

The present invention is for solving the above problem, and it is an object of the invention to provide a resin injection mold which can swiftly be heated and cooled.

To achieve the above object, the present invention provides a resin injection mold for molding a resin, including a shaped part produced by metal stereolithography, wherein the shaped part includes a low-density shaping part which has a small sintered density and through which gas passes, and a vent through which gas is sent to the low-density shaping part, or through which gas is sucked from the low-density shaping part.

According to the invention, since warm air and cold air can be blown to the low-density shaping part, it is possible to heat and cool the resin injection mold faster.

It is preferable that the low-density shaping part is provided in contact with a resin molding part which molds a resin, the resin molding part and a vent are connected to each other, and gas is sent from the vent to the resin molding part, or gas in the resin molding part is sucked into the vent. According to this configuration, since warm air and cold air can be blown to the resin molding part through the low-density shaping part, it is possible to heat and cool the surface of the resin injection mold faster. Since gas in the resin molding part can be sucked through the low-density shaping part, stagnant air in the resin molding part can be eliminated and non-infill of resin can be prevented.

It is preferable that the low-density shaping part is provided on all of surfaces of the resin molding part which are in contact with the low-density shaping part. According to this configuration, since the entire surface which is in contact with the resin molding part is the low-density shaping part, the amount of air to be sent can be increased, and it is possible to adjust a temperature of the surface of the resin injection mold faster. Further, it is possible to suck gas in the resin molding part faster.

It is preferable that an outer periphery of the shaped part includes a high-density shaped part having no air permeability. According to this configuration, since the outer periphery is made of the high-density shaped part, the strength of the resin injection mold can be enhanced.

BEST MODE FOR CARRYING OUT THE INVENTION (First Embodiment)

Figure 1:
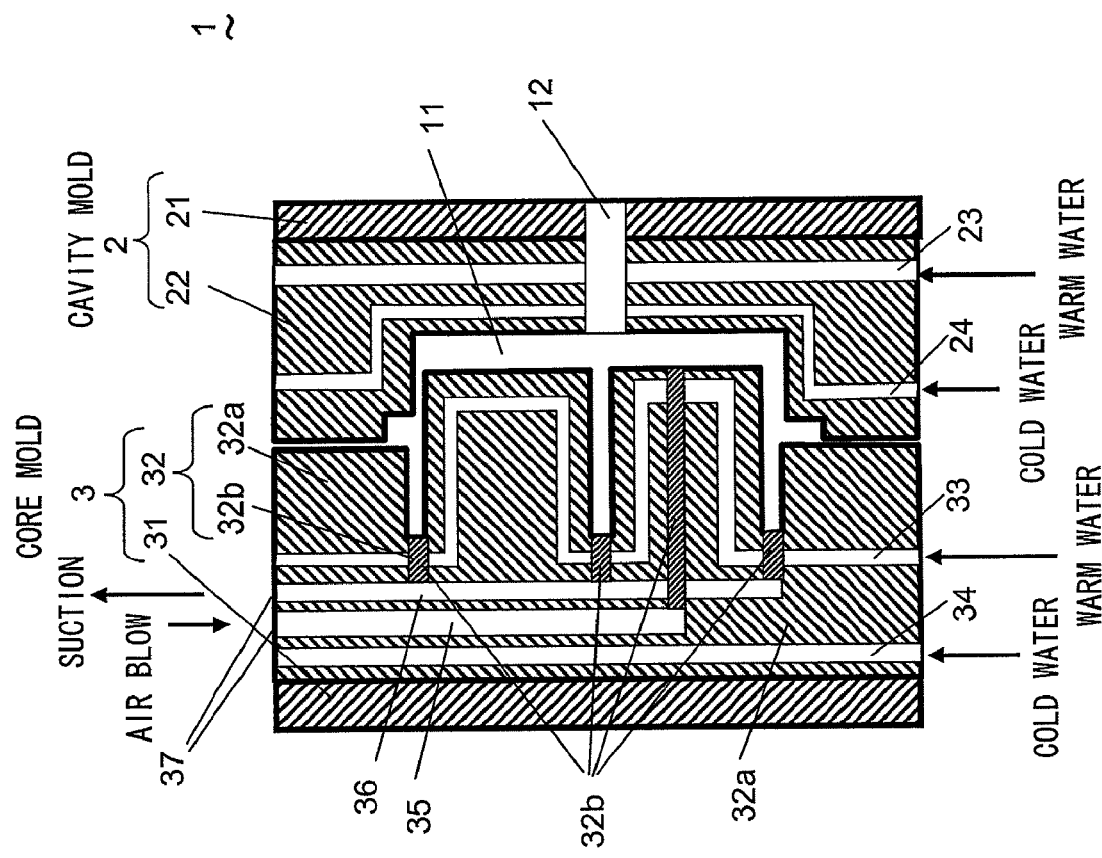
FIG. 1 is a sectional view of a resin injection mold according to a first embodiment of the present invention.

A resin injection mold (mold, hereinafter) according to a first embodiment of the present invention will be described with reference to FIG. 1. FIG. 1 shows a configuration of the mold 1. The mold 1 includes a cavity mold 2 and a core mold 3, and a resin molding part 11 which molds a resin is formed between the cavity mold 2 and the core mold 3. The cavity mold 2 and the core mold 3 are formed by sintering metal powder on base plates 21 and 31 by later-described metal stereolithography, and forming shaped parts 22 and 32. The shaped part 32 of the core mold 3 is formed from a high-density shaped part 32a except a portion of the shaped part 32, and the portion is formed from a low-density shaping part 32b. A sintered density of the metal powder of the high-density shaped part 32a is 95% or higher. A sintered density of the metal powder of the low-density shaping part 32b is 70 to 95%, and holes are in communication with each other.

The cavity mold 2 includes a sprue 12 through which a resin is supplied to the resin molding part 11. The cavity mold 2 includes a cavity warm water circuit 23 for flowing warm water to heat the cavity mold 2, and a cavity cold water circuit 24 for flowing cold water to cool the cavity mold 2. Similar to the cavity mold 2, the core mold 3 also includes a core warm water circuit 33 and a core cold water circuit 34. Rib-shaped tip ends of the core mold 3 where weld lines are prone to be generated and where a non-infill of resin is prone include low-density shaping parts 32b in contact with the resin molding part 11. The core mold 3 includes an air blowing passage 35 through which warm air or cold air is blown to the resin molding part 11, and a suction passage 36 through which gas in the resin molding part 11 is sucked. One ends of the air blowing passage 35 and the suction passage 36 are connected to the low-density shaping part 32b, and the other ends are connected to a vent 37 provided in an outer periphery of the core mold 3.

Figure 2:
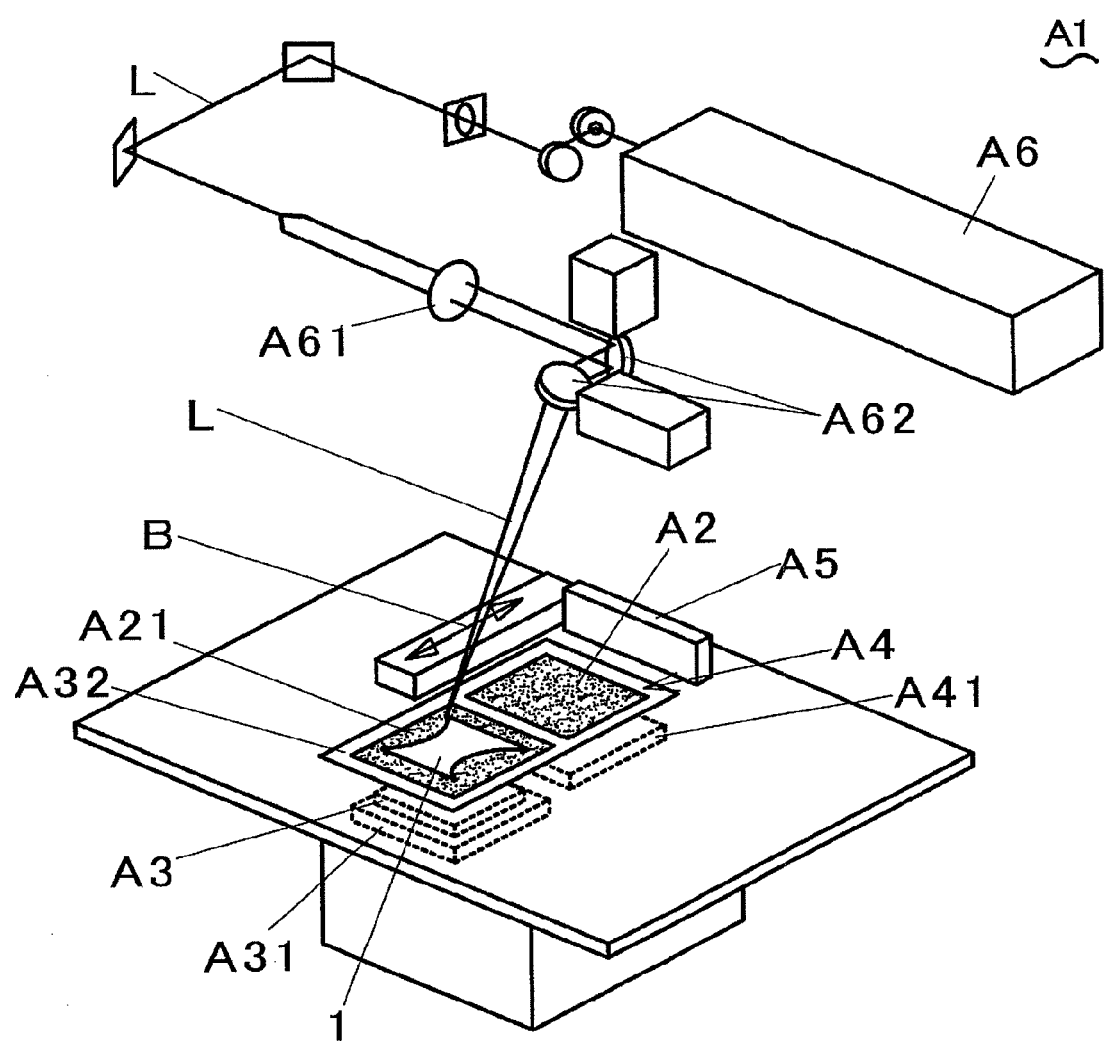
FIG. 2 is a perspective view of a metal stereolithography working machine used for producing the resin injection mold.

Next, the metal stereolithography for producing the mold 1 will be described with reference to FIGS. 2 and 3. FIG. 2 shows a configuration of a metal stereolithography working machine used for the metal stereolithography. The metal stereolithography working machine A1 includes a base plate A3 on which a powder layer A21 of metal powder A2 is laid, a shaping table A31 which holds the base plate A3 and vertically moves, a reference table A32 which becomes a criterion of a thickness of the powder layer A21, a supply tank A4 for supplying the metal powder A2, a material table A41 which vertically moves the metal powder A2 in the supply tank A4, a squeegee A5 for forming the powder layer A21, a beam oscillator A6 for emitting light beam L, a condenser A61 for gathering the light beam L, and a galvano mirror A62 for scanning the light beam L on the powder layer A21. The powder layer A21 is melted, or sintered and laminated by the light beam L and thus the mold 1 is produced.

Composition of the metal powder A2 is iron powder in which Ni is mixed. Material of the base plate A3 is S50C steel for example, and hardness thereof is HRC20. The squeegee A5 moves in a direction B, and supplies metal powder A2 on the material table A41 onto the base plate A3. The beam oscillator A6 is a carbon dioxide laser oscillator or a fiber laser oscillator.

Figure 3:
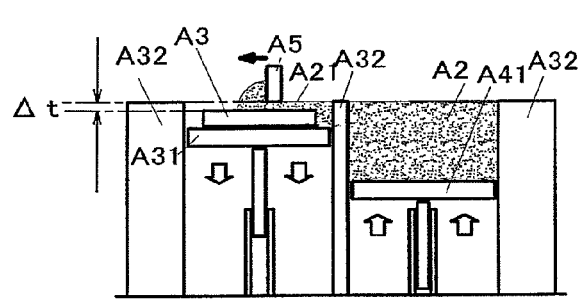
FIG. 3 is a diagram for explaining, in chronological order, a producing method of the metal stereolithography which produces the resin injection mold.
Figure 3:
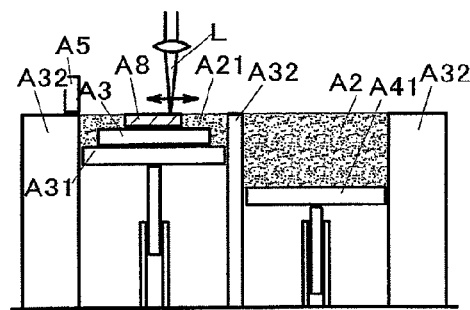
Figure 3:
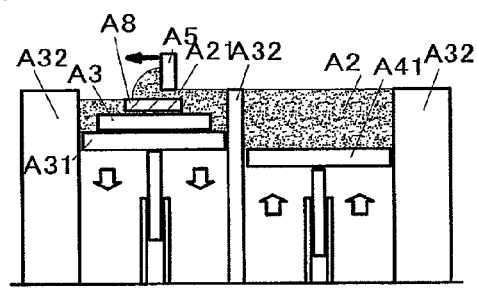
Figure 3:
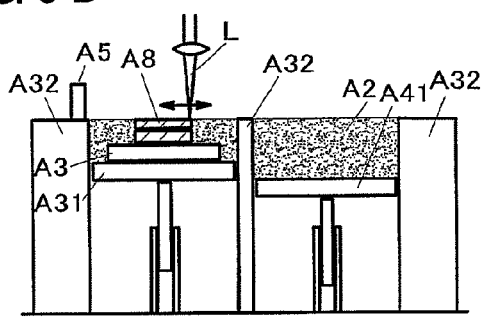
Figure 3:
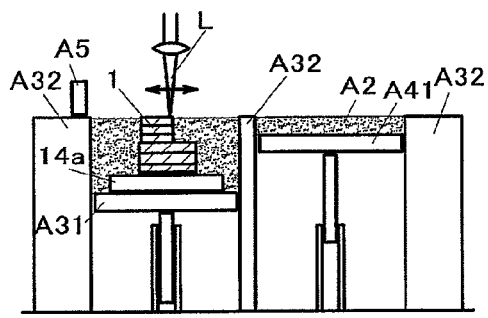

FIG. 3 shows operations of the producing method. First, the base plate A3 is placed on the shaping table A31. Next, the shaping table A31 is lowered such that a height difference between an upper surface of the base plate A3 and an upper surface of the reference table A32 becomes equal to a length $\Delta t$. Next, the metal powder A2 on the material table A41 is supplied onto the base plate A3 by the squeegee A5. The squeegee A5 moves horizontally at the same height as the upper surface of the reference table A32, and forms the powder layer A21 having the thickness $\Delta t$ on the base plate A3 (see FIG. 3(a)).

Next, the galvano mirror A62 scans the light beam L gathered by the condenser A61 at an arbitrary position, the powder layer A21 is melted and sintered, and a sintered cured layer A8 which is integral with the base plate A3 and which has a thickness $\Delta t$ is formed (see FIG. 3(b)). At that time, the sintered density is varied by adjusting intensity and scanning speed of the light beam L, and a low-density shaping part and a high-density shaped part are formed.

The forming operation of the powder layer A21 and the scanning operation of the light beam L are repeated, and the sintered cured layers A8 are laminated (see FIG. 3(c) and FIG. 3(d)). The sintered cured layers A8 are laminated until the shaping operation is completed, and the mold 1 is formed (see FIG. 3(e)).

Figure 4:
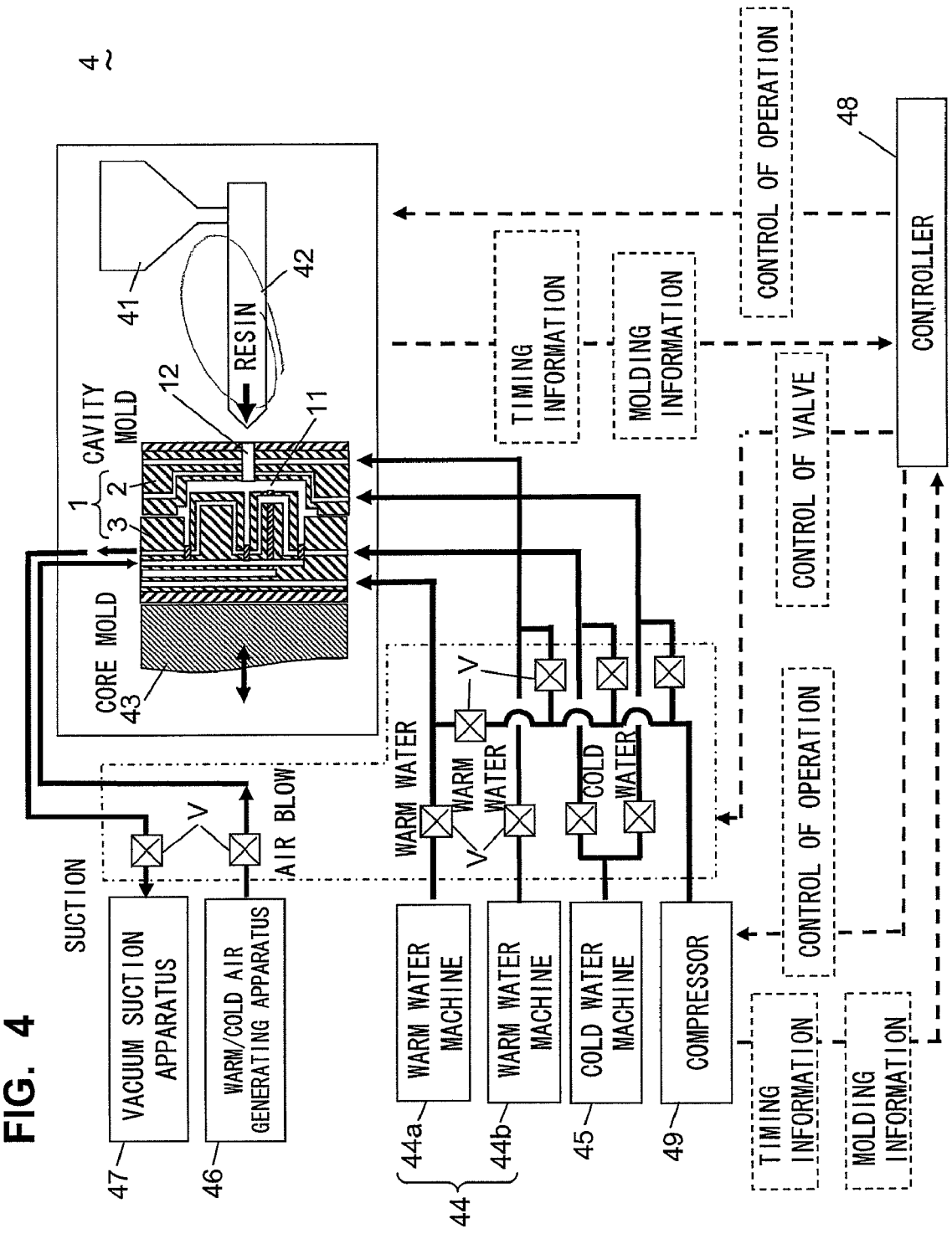
FIG. 4 is a block diagram of an injection molding machine using the resin injection mold.

Next, the injection molding machine using the mold 1 will be described with reference to FIG. 4. FIG. 4 shows a configuration of the injection molding machine. The injection molding machine 4 includes a hopper 41 into which resin material is fed, a heating cylinder 42 for heating the fed resin material and melting and mixing the resin material, the mold 1 having the cavity mold 2 and the core mold 3 for molding a resin, and a movable plate 43 connected to the core mold 3 for opening and closing the core mold 3. The resin melted in the heating cylinder 42 is injected into the resin molding part 11 through the sprue 12 by a screw (not shown) in the heating cylinder 42. The injection molding machine 4 includes warm water machine 44 for sending warm water to the cavity warm water circuit 23 and the core warm water circuit 33, a cold water machine 45 for sending cold water to the cavity cold water circuit 24 and the core cold water circuit 34, a warm/cold air generating apparatus 46 for sending warm air and cold air to the air blowing passage 35, a vacuum suction apparatus 47 for sucking gas from the suction passage 36, and a controller 48 for controlling operations of the various members. Water and air are sent by opening and closing a valve V.

The injection molding machine 4 includes a compressor 49 for sending compressed air to the cavity warm water circuit 23 and the like. Forming information such as a temperature of the mold 1, a temperature of the heating cylinder 42 and an injection pressure, as well as timing information such as opening and closing operation of the core mold 3 and injection operation are sent to the controller 48 from various members, and the controller 48 controls the operation of the various members based on the pieces of information.

Figure 5:
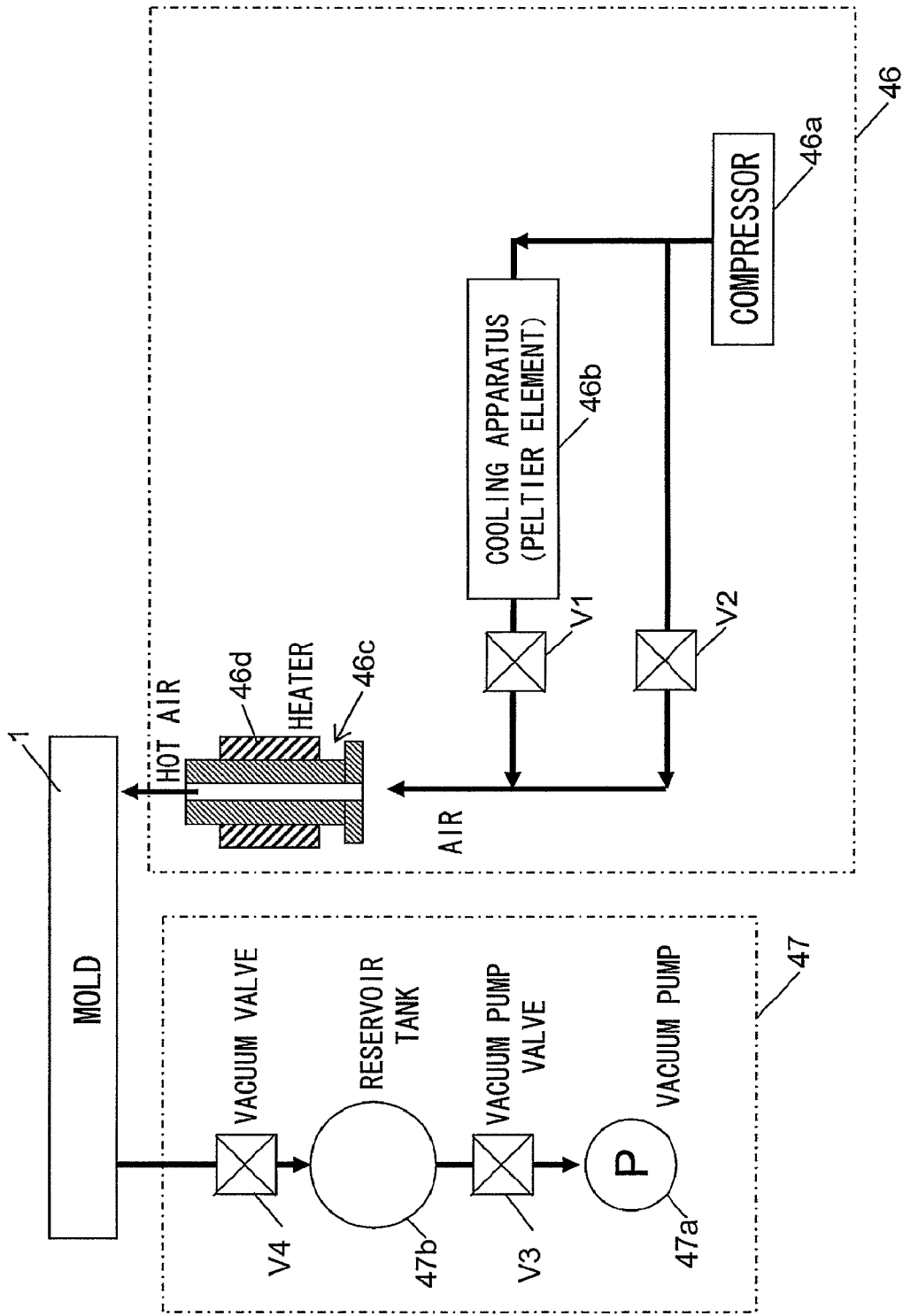
FIG. 5 is a block diagram of a warm/cold air generating apparatus and a vacuum suction apparatus of the injection molding machine.

Next, the warm/cold air generating apparatus 46 and the vacuum suction apparatus 47 will be described with reference to FIG. 5. FIG. 5 shows configurations of the warm/cold air generating apparatus 46 and the vacuum suction apparatus 47. The warm/cold air generating apparatus 46 includes a compressor 46a for generating compressed air, a cooling apparatus 46b having a Peltier element and cooling the compressed air, a heating part 46c having a heater and heating the compressed air, and a cold air valve V1 and a warm air valve V2. When warm air is sent to the mold 1, the controller 48 closes the cold air valve V1, opens the warm air valve V2, turns ON the heater 46d of the heating part 46c, and sends air by the compressor 46a. When cold air is sent to the mold 1, the controller 48 opens the cold air valve V1, closes the warm air valve V2, turns ON the cooling apparatus 46b, turns OFF the heater 46d, and sends air by the compressor 46a. To increase the pressure of the compressed air of the compressor, a booster may be provided after the compressor 46a. An amount of air to be sent into the mold 1 can be increased.

The vacuum suction apparatus 47 includes a vacuum pump 47a for evacuation, a reservoir tank 47b held in a vacuum state, a vacuum pump valve V3 disposed between the vacuum pump 47a and the reservoir tank 47b, and a vacuum valve V4 disposed between the reservoir tank 47b and the mold 1. In a normal state, the controller 48 closes the vacuum valve V4 and opens the vacuum pump valve V3, and the vacuum pump 47a maintains the reservoir tank 47b in its vacuum state. When the mold 1 is evacuated, the controller 48 opens the vacuum valve V4 and sucks gas in the mold 1 into the reservoir tank 47b.

Figure 6:
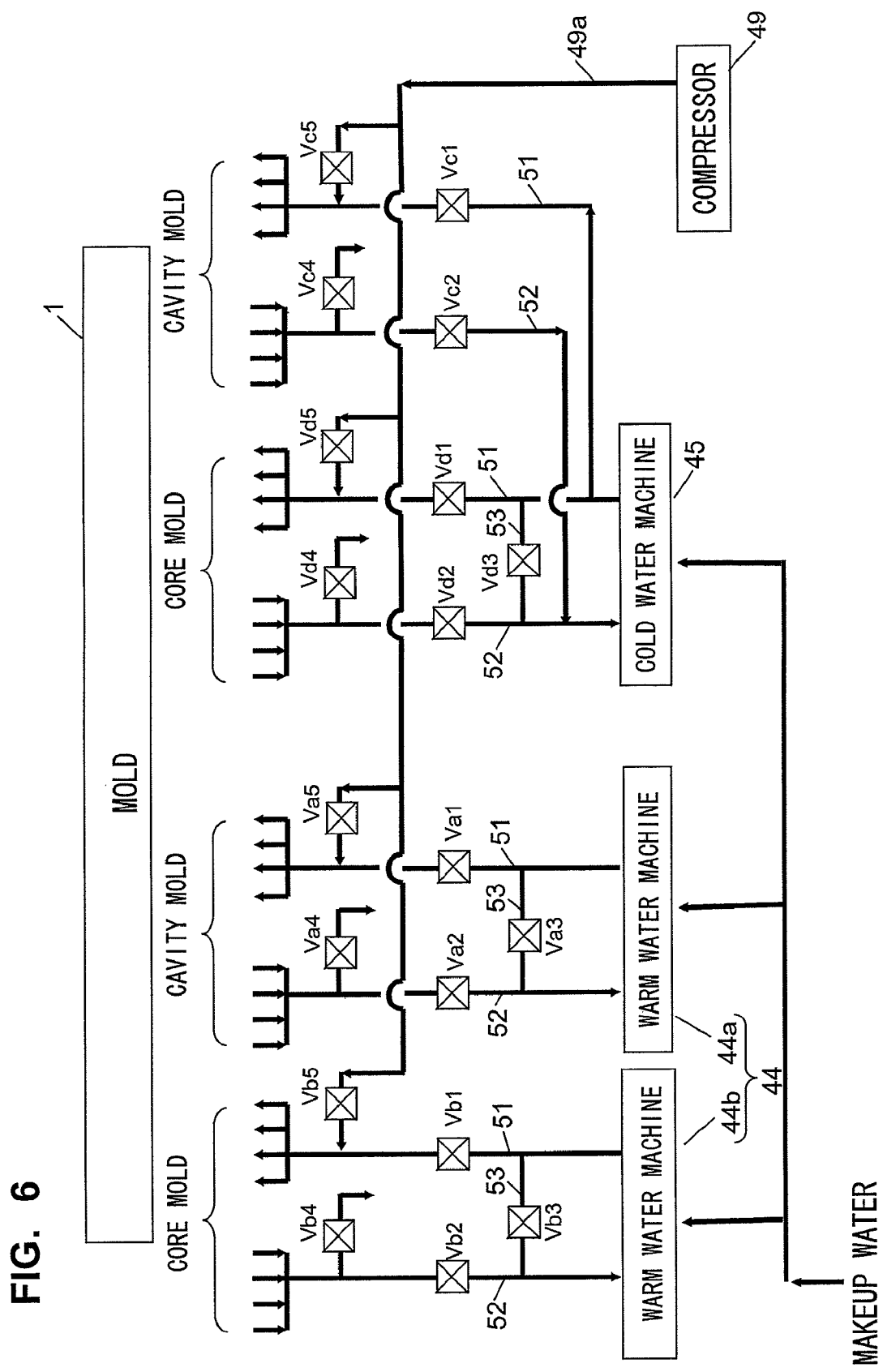
FIG. 6 is a block diagram of a warm water machine and a cold water machine of the injection molding machine.

Next, the warm water machine 44, the cold water machine 45 and the compressor 49 will be described with reference to FIG. 6. FIG. 6 shows a configuration of pipes for connecting the warm water machine 44, the cold water machine 45 and the compressor 49 to the mold 1. The warm water machine 44 includes a warm water machine 44a for a cavity mold and a warm water machine 44b for a core mold. The cavity mold 2 and the core mold 3 respectively have warm water containers so that the molds can be heated to appropriate temperatures, respectively. The warm water machine 44a is connected to a water-sending pipe 51 through which warm water is sent to the cavity mold 2, and water-returning pipes 52 which receive water returned from the cavity mold 2. The water-sending pipe and the water-returning pipe are connected to each other through a bypass pipe 53. A water-sending valve Va1 is disposed in the water-sending pipe 51, a water-returning valve Va2 is disposed in the water-return pipe 52, and a bypass valve Va3 is disposed in the bypass pipe 53. The water-return pipe 52 is connected to a drain valve Va4 for draining water. The water-sending pipe 51 is connected to the compressor 49 through a compression pipe 49a and a purge valve Va5. The warm water machine 44b also has the same configuration as that of the warm water machine 44a.

The cold water machine 45 is connected to a water-sending pipe 51 through which warm water is sent to the cavity mold 2 and the core mold 3, and is also connected to a water-return pipe 52 which receives water returned from the cavity mold 2 and the core mold 3. The water-sending pipe 51 and the water-return pipe 52 are connected to each other through a bypass pipe 53. Water-sending valves Vc1 and Vd1 are disposed in the water-sending pipe 51, water-returning valves Vc2 and Vd2 are disposed in the water-return pipe 52, and a bypass valve Vd3 is disposed in the bypass pipe. The water-return pipe 52 is connected to drain valves Vc4 and Vd4 for draining water. The water-sending pipe 51 is connected to the compressor 49 through the compression pipe 49a and purge valves Vc5 and Vd5. The cold water machine 45 may be provided for each of the cavity mold 2 and the core mold 3. The molds can be cooled to appropriate temperatures, respectively.

To maintain the cavity mold 2 and the core mold 3 at a high temperature, the controller 48 always operates pumps (not shown) incorporated in the warm water machine 44a and the warm water machine 44b, opens the water-sending valves Va1 and Vb1 and the water-returning valves Va2 and Vb2, and closes the bypass valves Va3 and Vb3, the drain valves Va4 and Vb4 and the purge valves Va5 and Vb5, and circulates heated warm water through the cavity mold 2 and the core mold 3. When the cavity mold 2 and the core mold 3 are to be cooled by the cold water machine 45, the water-sending valves Va1 and Vb1 and the water-returning valves Va2 and Vb2 are closed, the bypass valves Va3 and Vb3 are opened, warm water is circulated through the bypass pipe, water is not sent to the cavity mold 2 and the core mold 3, and the heating operation is stopped. When the cooling operation of the cold water machine 45 is to be started, the controller 48 opens the drain valves Va4 and Vb4 and the purge valves Va5 and Vb5, operates the compressor 49, and warm water in the cavity warm water circuit 23 and the core warm water circuit 33 is drained by compressed air. Since warm water in the warm water circuit is drained, the cooling operation can be carried out faster.

When the cavity mold 2 and the core mold 3 are to be cooled, the controller 48 operates a pump (not shown) incorporated in the cold water machine 45, opens the water-sending valves Vc1 and Vd1 and the water-returning valves Vc2 and Vd2, closes the bypass valve Vd3, the drain valves Vc4 and Vd4 and the purge valves Vc5 and Vd5, and circulates cold water through the cavity mold 2 and the core mold 3. If the cooling operation is completed, the controller 48 closes the water-sending valves Vc1 and Vd1 and the water-returning valves Vc2 and Vd2, opens the bypass valve Vd3, circulates water through the bypass pipe, so that water is not sent to the cavity mold 2 and the core mold 3, and the cooling operation is completed. The controller 48 opens the drain valves Vc4 and Vd4 and the purge valves Vc5 and Vd5, operates the compressor 49, and drains cold water in the cavity cold water circuit 24 and the core cold water circuit 34 by compressed air. Since water in the cold water circuit is drained, the heating operation can be carried out faster.

Next, operation of the injection molding machine 4 will be described with reference to FIGS. 1 and 4. If the operation is started, the controller 48 heats the heating cylinder 42 to melt a resin, makes the warm water machine 44a and the warm water machine 44b flow warm water through the cavity warm water circuit 23 and the core warm water circuit 33, and heats the cavity mold 2 and the core mold 3. If the resin in the heating cylinder 42 is melted and temperatures of the cavity mold 2 and the core mold 3 become equal to or higher than predetermined values, the controller 48 moves the movable plate 43, closes and clamps the core mold 3 and the cavity mold 2. When temperatures of portions of the cavity mold 2 and the core mold 3 facing the resin molding part 11 are low, the controller 48 sprays warm air heated by the warm/cold air generating apparatus 46 to the cavity mold 2 and the core mold 3 from the air blowing passage 35 through the low-density shaping part 32b, thereby increasing the temperatures. At that time, if the temperatures are excessively increased, the controller 48 sprays cold air cooled by the cooling apparatus 46b to lower the temperatures. Since the warm air or cold air can be sprayed to the resin molding part 11 through the low-density shaping part 32b, the surface of the mold 1 can be heated and cooled faster.

Next, the resin is injected into the resin molding part 11 by the screw provided in the heating cylinder 42. At that time, gas in the resin molding part 11 is sucked by the vacuum suction apparatus 47 from the suction passage 36 through the low-density shaping part 32b. Stagnant air in the resin molding part 11 is eliminated so that non-infill of resin can be prevented. If the injection of the resin is completed, the controller 48 keeps the pressure while keeping the core mold 3 clamped.

If predetermined time is elapsed during pressure keeping, the heating operation is switched to the cooling operation. The controller 48 switches between opening and closing of the bypass valve Va3 and the like, warm water circulating through the cavity mold 2 and the core mold 3 is made to circulate through the bypass pipe, and cold water is made to circulate through the cavity cold water circuit 24 and the core cold water circuit 34 by the cold water machine 45. At that time, since warm water remaining in the cavity warm water circuit 23 and the core warm water circuit 33 is drained by the compressed air of the compressor 49, the cooling operation can be carried out faster.

If the cooling operation is completed, the controller 48 opens the core mold 3 by the movable plate 43 and takes out the molded resin by an ejector pin (not shown). The controller 48 switches the mold 1 from cooling to heating. By switching opening and closing of the bypass valve Vd3 and the like, cold water circulating through the cavity mold 2 and the core mold 3 is made to circulate through the bypass pipe, and warm water is made to circulate through the cavity warm water circuit 23 and the core warm water circuit 33 by the warm water machines 44a and 44b. At that time, since cold water remaining in the cavity cold water circuit 24 and the core cold water circuit 34 is drained by compressed air of the compressor 49, the heating operation can be carried out faster.

(Second Embodiment)

Figure 7:
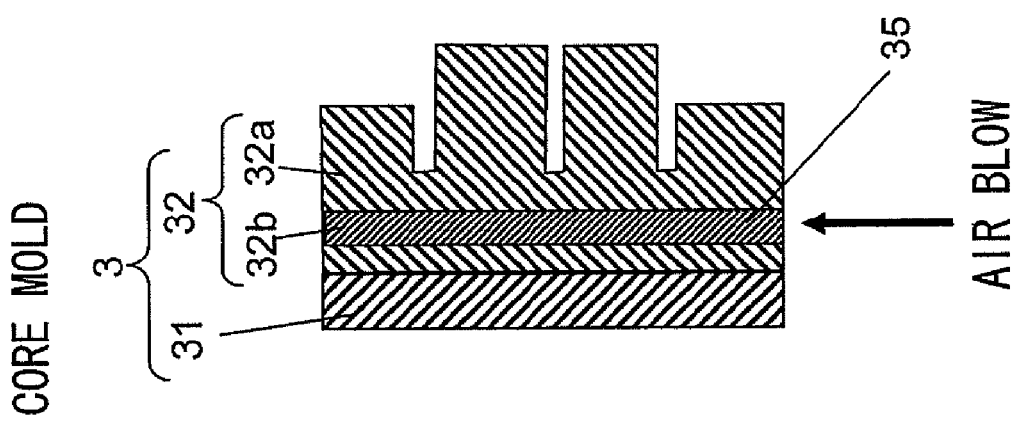
FIG. 7 is a sectional view of a resin injection mold according to a second embodiment of the invention.

A resin injection mold according to a second embodiment of the invention will be described with reference to FIG. 7. FIG. 7 shows a sectional view of a core mold 3. The core mold 3 is opposed to a cavity mold (not shown, but this is the same as that described in the first embodiment, and the same is applied in the subsequent embodiments also), and a resin molding part is formed between the core mold 3 and the cavity mold. The core mold 3 is formed from the high-density shaped part 32a except a portion of a shaped part 32, and an air blowing passage 35 formed from a low-density shaping part 32b is formed in a high-density shaped part 32a. The air blowing passage 35 passes through only the interior of the core mold 3. Since warm air and cold air can be blown to the low-density shaping part 32b, the core mold 3 can be heated or cooled faster.

(Third Embodiment)

Figure 8:
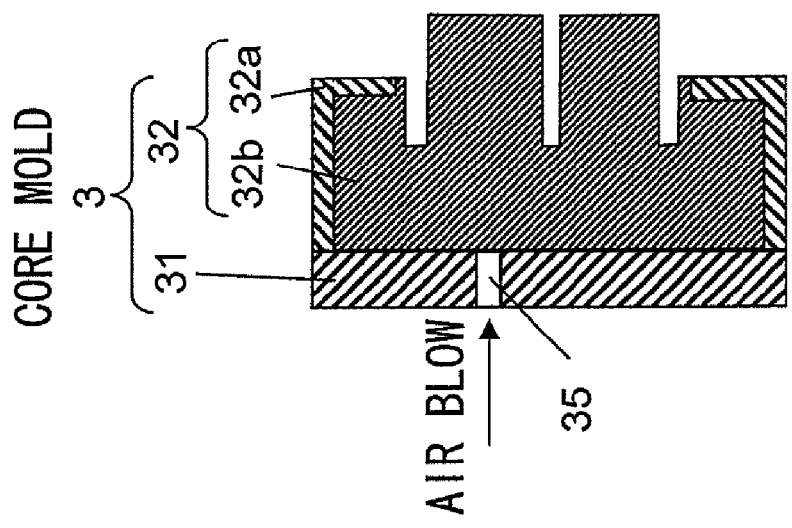
FIG. 8 is a sectional view of a resin injection mold according to a third embodiment of the invention.

A resin injection mold according to a third embodiment of the invention will be described with reference to FIG. 8. FIG. 8 shows a sectional view of a core mold 3. All of surfaces which contact the resin molding part 11 of the core mold 3 are formed from a low-density shaping part 32b and only an outer periphery of the core mold 3 which is not in contact with a resin molding part is formed from a high-density shaped part 32a. An air blowing passage 35 which is in communication with the low-density shaping part 32b is provided in a base plate 31 of the core mold 3. Since an area of the low-density shaping part 32b of the core mold 3 which is in contact with the resin molding part is wide, it is possible to swiftly adjust a temperature of surfaces of the core mold 3 and the cavity mold when warm air or cold air is sent from the air blowing passage 35 to the resin molding part through the low-density shaping part 32b. When gas is sucked from the air blowing passage 35 at the time of injection of the resin, gas in the resin molding part can be sucked fast and non-infill of resin can be prevented.

(Fourth Embodiment)

Figure 9:
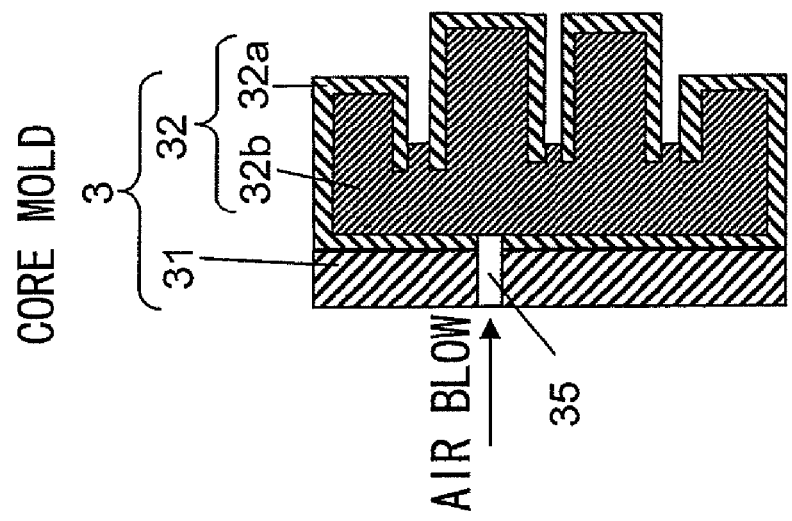
FIG. 9 is a sectional view of a resin injection mold according to a fourth embodiment of the invention.

A resin injection mold according to a fourth embodiment of the invention will be described with reference to FIG. 9. FIG. 9 shows a sectional view of a core mold 3. The core mold 3 includes a shaped part 32 formed from a low-density shaping part 32b except its outer periphery, and the outer periphery of the shaped part 32 is formed from a high-density shaped part 32a. An air blowing passage 35 which is in communication with the low-density shaping part 32b is formed such that it penetrates a base plate 31 and the high-density shaped part 32a. Air is sent to a resin molding part through the low-density shaping part 32b, and gas is sucked from the resin molding part. Since the outer periphery of the shaped part 32 is formed from the high-density shaped part 32a, the strength of the core mold 3 can be enhanced.

(Fifth Embodiment)

Figure 10:
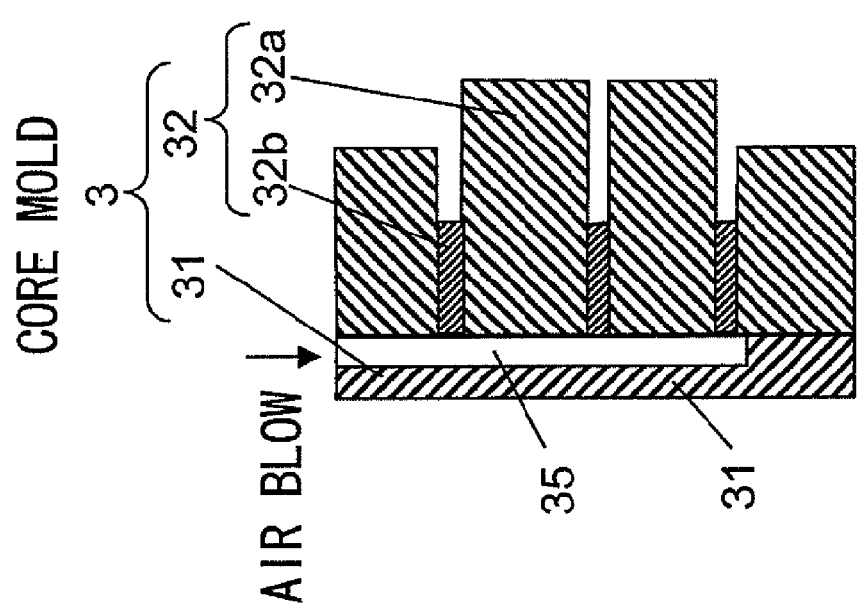
FIG. 10 is a sectional view of a resin injection mold according to a fifth embodiment of the invention.

A resin injection mold according to a fifth embodiment of the invention will be described with reference to FIG. 10. FIG. 10 shows a sectional view of a core mold 3. According to the core mold 3, a groove is formed in a base plate 31 and an air blowing passage 35 is formed. A shaped part 32 is formed from a high-density shaped part 32a except a partial low-density shaping part 32b. Air is sent from the air blowing passage 35 through the low-density shaping part 32b, and gas is sucked from the resin molding part. The air blowing passage 35 is formed in the base plate 31, it is unnecessary to form the air blowing passage 35 in the shaped part 32 and therefore, it is easy to carry out metal stereolithography of the shaped part 32.

(Sixth Embodiment)

Figure 11:
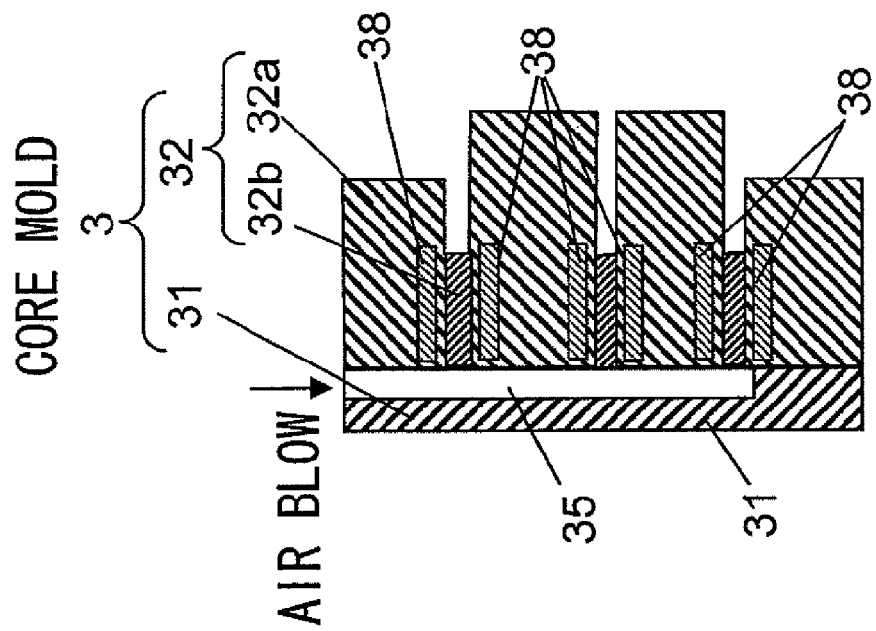
FIG. 11 is a sectional view of a resin injection mold according to a sixth embodiment of the invention.

A resin injection mold according to a sixth embodiment of the invention will be described with reference to FIG. 11. FIG. 11 shows a sectional view of a core mold 3. According to the core mold 3, in addition to the configuration of the fifth embodiment, thermal insulating parts 38 are formed in a high-density shaped part 32a around a low-density shaping part 32b through which air is sent. Each of the thermal insulating parts 38 is formed from the low-density shaping part. The thermal insulating parts 38 prevent heat of warm air sent to the resin molding part from being dispersed toward the high-density shaped part 32a, and prevent cold air sent to the resin molding part from being heated by heat of the high-density shaped part 32a. Therefore, it becomes easy to adjust a temperature of the mold.

The present invention is not limited to the configurations of the embodiments, and the invention can variously be modified within a range not changing a subject matter of the invention. For example, the low-density shaping part may be provided in the cavity mold. The same effect as that when the low-density shaping part is provided in the core mold can be obtained.

The present application claims a priority right based on Japanese Patent Application No. 2008-082165, and the entire contents including disclosure and the like of this application are incorporated herein by reference.

The invention claimed is:

1. A resin injection mold for molding a resin, comprising:
a shaped part produced by metal stereolithography in which a light beam irradiates metal powder to sinter, or to melt and solidify the metal powder, wherein
the shaped part includes a plurality of low-density shaping parts having a small sintered density to allow gas to pass through the low-density shaping parts, and
a vent through which the gas, comprising a heated or a cooled gas, is sent to the low-density shaping parts, or through which the gas is sucked from the low-density shaping parts,
wherein the low-density shaping parts are each in contact with a resin molding part which molds a resin, and are connected to the vent, and
the gas is sent from the vent through the low-density shaping parts to the resin molding part, or the gas in the resin molding part is sucked through the low-density shaping parts into the vent.

2. The resin injection mold according to claim 1, wherein the low-density shaping parts are provided on all surfaces of the shaped part which contact the resin molding part.

3. The resin injection mold according to claim 1, wherein the small sintered density of the low-density shaping parts is greater than or equal to 70% and less than 95%.

4. The resin injection mold according to claim 1, wherein an outer periphery of the shaped part includes a high-density shaped part having no air permeability.

5. The resin injection mold according to claim 4, wherein the high-density shaped part has a metal powder sintered density of greater than or equal to 95%.

6. The resin injection mold according to claim 2, wherein an outer periphery of the shaped part includes a high-density shaped part having no air permeability.

7. The resin injection mold according to claim 6, wherein the high-density shaped part has a metal powder sintered density of greater than or equal to 95%.

8. The resin injection mold according to claim 3, wherein an outer periphery of the shaped part includes a high-density shaped part having no air permeability.

9. The resin injection mold according to claim 8, wherein the high-density shaped part has a metal powder sintered density of greater than or equal to 95%.

10. A resin injection mold for molding a resin, comprising:
a shaped part produced by metal stereolithography in which a light beam irradiates metal powder to sinter, or to melt and solidify the metal powder, wherein
the shaped part includes a plurality of low-density shaping parts having a small sintered density to allow gas to pass through the low-density shaping parts, and
a vent through which the gas, comprising a heated gas or a cooled gas, is sent to the low-density shaping parts, or through which the gas is sucked from the low-density shaping parts,
wherein the low-density shaping parts are each in contact with a resin molding part which molds a resin, at a position of the resin molding part where a non-infill of the resin is prone to form, the resin molding part and the vent are connected to each other through the low-density shaping parts and an air blowing passage or a suction passage, and the gas is sent from the vent through the air blowing passage and the low-density shaping parts to the resin molding part, or the gas in the resin molding part is sucked through the low-density shaping parts and the suction passage into the vent.

11. The resin injection mold according to claim 10, wherein the low-density shaping parts are provided on all surfaces of the shaped part which contact the resin molding part.

12. The resin injection mold according to claim 10, wherein the small sintered density of the low-density shaping parts is greater than or equal to 70% and less than 95%.

13. The resin injection mold according to claim 10, wherein an outer periphery of the shaped part includes a high-density shaped part having no air permeability.

14. The resin injection mold according to claim 13, wherein the high-density shaped part has a metal powder sintered density of greater than or equal to 95%.

15. The resin injection mold according to claim 11, wherein an outer periphery of the shaped part includes a high-density shaped part having no air permeability.

16. The resin injection mold according to claim 15, wherein the high-density shaped part has a metal powder sintered density of greater than or equal to 95%.

17. The resin injection mold according to claim 12, wherein an outer periphery of the shaped part includes a high-density shaped part having no air permeability.

18. The resin injection mold according to claim 17, wherein the high-density shaped part has a metal powder sintered density of greater than or equal to 95%.

* * * * *